April 23, 1968   B. F. WILSON   3,379,032
TEMPERATURE STABILIZATION APPARATUS FOR WELL LOGGING SYSTEMS
Filed Dec. 21, 1965

INVENTOR.
BILLY F. WILSON
BY E. F. Bard
ATTORNEY

_United States Patent Office_

3,379,032
Patented Apr. 23, 1968

3,379,032
TEMPERATURE STABILIZATION APPARATUS
FOR WELL LOGGING SYSTEMS
Billy F. Wilson, Houston, Tex., assignor to Dresser Industries, Inc., Dallas, Tex., a corporation of Delaware
Filed Dec. 21, 1965, Ser. No. 515,368
3 Claims. (Cl. 62—259)

ABSTRACT OF THE DISCLOSURE

Electronic components which fail at a predetermined temperature are mounted upon a compartment having therein a material having a melting point which is lower than said predetermined temperature and coupling means for thermally interconnecting the heat sink and the component.

---

This invention relates to apparatus for use in well logging systems, and more particularly relates to improved apparatus for stabilizing the temperature of temperature-sensitive electronic equipment employed for logging subsurface earth formations.

It is well known to make various types of measurements in earth boreholes, for the purpose of investigating subsurface earth formations, and it is also well known to employ electronic apparatus such as scintillation counter detectors and pulse amplitude discriminators for such purposes. However, it is further known that an extreme range of temperatures may be encountered in the typical earth borehole, and that these temperature extremes will adversely affect the operating characteristics of such electronic equipment, unless protective measures are employed to maintain such equipment within a preselected temperature range.

Accordingly, techniques such as those described in U.S. Patent No. 2,711,084, which issued to R. A. Bergan on June 21, 1955, have been employed, whereby the electronic circuitry to be protected is disposed in a vacuum bottle containing water and a heat exchanger refrigerating device. The heat exchanger is activated to freeze the water, and the resulting ice which is in thermal contact with the electronic gear, functions as a heat sink to keep the temperature of the electronic gear at or close to the temperature of the ice.

The foregoing technique is presently widely used throughout the industry. However, it should be realized that the logging system cannot be kept in a borehole any longer than the time required to melt the ice in the vacuum bottle, and that this time will depend largely on the amount or volume of ice in the vacuum bottle. In other words, the more ice there is in the vacuum bottle, the longer will be the time required to melt it, and the longer the subsurface apparatus can be kept in the borehole.

It is the trend in the oil and gas industry, to drill boreholes having as small a diameter as is practicable under the circumstances. Thus, boreholes have been getting smaller, over the years, and this has sharply reduced the cross section and consequently the volume of the vacuum bottle used for these purposes. Consequently, apparatus such as that which is depicted in the aforementioned Bergan patent, now contain substantially less ice than could formerly be provided, and thus the useful period during which such gear can be kept in the borehole has been significantly shortened.

Another appreciable disadvantage with the prior art is that the water in the vacuum bottle must be frozen before it will function as desired. Since water will not freeze at normal ambient temperatures, it has been necessary to keep the heat exchanger device in the bottle, notwithstanding that it occupies space which could preferably be used for additional water. Furthermore, it is inconvenient to use the heat exchanger to refreeze the water, if this operation must be performed "in the field."

These disadvantages of the prior art are overcome with the present invention, and novel apparatus is provided herein for stabilizing temperature-sensitive electronic gear for a much longer period of time, and which apparatus includes a heat sink means which automatically refreezes at or above "room temperature" without the assistance of a refrigeration device.

Accordingly, it is an object of the present invention to provide an improved heat sink for stabilizing the temperature of electronic gear in well logging apparatus.

It is also an object of the present invention to provide temperature stabilizing apparatus having a greatly improved eurythermal capability.

It is further an object of the present invention to provide temperature stabilizing apparatus having a heat sink means composed of a material with a melting point which is within or above "room temperature," and which is below the temperature at which the component to be protected will become damaged or will begin to operate improperly.

It is a specific object of the present invention to provide in a well logging system having an electronic component which would fail at a predetermined temperature the improvement for maintaining said component at a temperature lower than said predetermined temperature, said improvement comprising a heat sink formed of a solid material having a melting point which is greater than the freezing point of water and which is lower than said predetermined temperature, and coupling means for thermally interconnecting said heat sink and said component.

The advantaoges of the present invention are preferably attained by novel apparatus which includes a cylindrical aluminum canister of a size to fit into a conventional vacuum bottle, and by disposing the electronic gear to be protected inside the aluminum canister. Thereafter, all space inside the aluminum canister, which is not occupied by the electronic gear, is filled with a suitable material having a melting point which is within or above the range of so-called "room temperature," but which is also below the maximum safe temperature for the component to be protected. As will hereinafter be explained, a particularly suitable material is a metallic eutectic having a suitable melting point, or a nonmetallic substance having a similar characteristic. The canister is preferably housed in a thermally non-conductive container, such as a vacuum bottle.

Accordingly, these and other objects and features of the present invention will be apparent from the following detailed description, wherein reference is made to the figures in the accompanying drawings.

Figure 1:
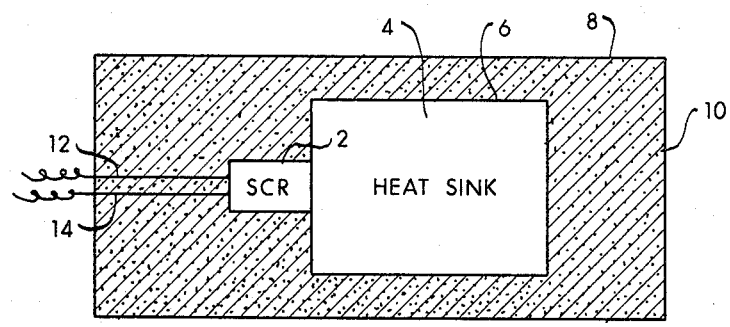
FIGURE 1 shows a functional representation of one embodiment of the present invention adapted to stabilize the temperature of an isolated electronic component.

Referring now to FIGURE 1, there is depicted a simplified pictorial representation, partly in cross section, of one embodiment of the present invention, wherein may be seen a silicon controlled rectifier 2 which is commonly known to fail at 300 degrees F. It will be apparent, therefore, that if such a component is intended to be used for well logging purposes, wherein borehole temperatures far in excess of 300 degrees F. are frequently encountered, that measures must be taken to maintain the silicon controlled rectifier at a lower temperature during all logging operations.

Accordingly, there may be seen a heat sink 4 disposed in thermal connection with the rectifier 2, so as to draw off heat in the rectifier 2, and to maintain this or any other components so arranged, at a temperature which is only a little higher than that of the heat sink 4. As hereinbefore stated, the heat sink 4 is preferably formed of a substance or material having a melting point which is below the temperature at which the rectifier 2 will fail, but is also preferably within the range known as "room temperature." Thus, the heat sink 4 may be refrozen at any time, by merely exposing it. Any material which has these characteristics may be used for these purposes. However, a particularly suitable material for use with the aforementioned silicon controlled rectifier 2 is a metallic eutectic composed of 58% bismuth and 42% tin. This alloy has a melting point of about 281 degrees F., and is therefore particularly suited to these purposes insofar as the aforementioned rectifier 2 is concerned. Certain non-metallic substances which are also suitable for these purposes, are urethane and sodium phosphate.

It should be realized that it is important to maintain as small a temperature gradient as possible, between the rectifier 2 or other component and the heat sink 4. Accordingly, efficient thermal connection between the rectifier 2 and the heat sink 4 is very desirable, and this may be obtained by disposing the heat sink 4 in a container 6 which is formed of a substance of high thermal conductivity such as aluminum or copper, and by positioning the rectifier 2 in physical contact with the container 6. The entire assembly is then preferably sealed in a canister 8 which is filled with a thermally non-conductive material 10 such as any of the well known plastic foam-like materials. The leads 12 and 14 from the rectifier 2 may be permitted to extend out of the canister 8, and the entire assembly will then constitute a thermally stable module.

Figure 2:
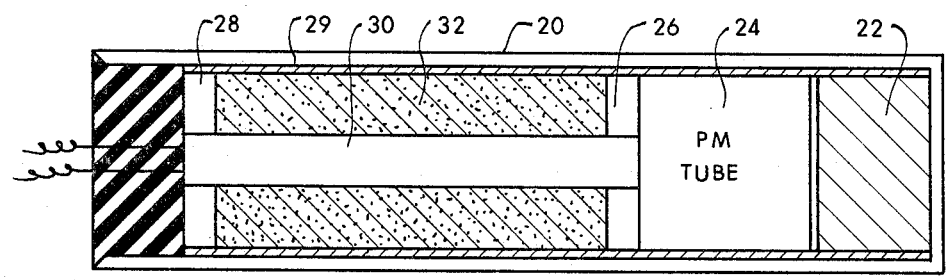
FIGURE 2 shows a functional representation of another embodiment of the present invention adapted to maintain a scintillation counter detector and associated electronic gear at a preselected stable temperature.

Referring now to FIGURE 2, there may be seen another embodiment of the present invention which is adapted to provide an improved radiation detector for a radioactivity well logging instrument. In particular, there is provided a suitable vacuum bottle 20 having in its closed end a phosphor 22 and a photomultiplier tube 24. In addition, there may be seen two aluminum end plugs 26 and 28 and a metallic sleeve 29, preferably of aluminum, which serve to support a canister 30 holding the usual electronic circuitry associated with a scintillation counter detector, such as a line driver circuit, one or more flip flop circuits, a voltage regulator and a pulse amplitude discriminator. It will be readily apparent to those having experience in this art, that this type of circuitry, as well as the photomultiplier tube 24 and phosphor 22, is particularly susceptible to erratic performance, failure, and even permanent damage, when high ambient temperatures are encountered. Accordingly, there is provided about the canister 30, and between the end plugs 26 and 28, a heat sink 32 formed, as hereinbefore explained, of a material such as urethane. The aluminum sleeve 29 may be seen to extend over the photomultiplier tube 24 and phosphor 22, to provide an effective thermal connection between the heat sink 32 and the photomultiplier tube 24, phosphor 22, and circuitry 30. Thus, the heat sink 32 will, in cooperation with the vacuum bottle 20, effectively maintain the actual temperature of the scintillation counter detector, as well as the electronics 30 associated therewith, at a temperature substantially at or below the melting point of the heat sink 32 material. In fact, it has been determined by actual tests that the assembly depicted in FIGURE 2 can maintain the photocathode (not depicted), of the photomultiplier tube 24, at a temperature below 128 degrees F., while the entire assembly was subjected to an ambient temperature of 400 degrees F. for five hours.

Numerous other variations and modifications may obviously be made without departing from the basic concepts of the present invention. Accordingly, it should be clearly understood that the forms of the invention described herein and depicted in the accompanying drawings, are illustrative only, and are not intended to limit the scope of the invention.

What is claimed is:

1. In a well logging system having an electronic component which fails at a predetermined temperature, the improvement for maintaining said component at a temperature lower than said predetermined temperature, said improvement comprising a heat sink formed of urethane having a melting point greater than the freezing point of water and lower than said predetermined temperature, and coupling means for thermally interconnecting said heat sink and said component, said component, said heat sink and said coupling means being surrounded by a foam material for shielding said component and said heat sink from ambient temperatures greater than said predetermined temperature.

2. In the well logging system according to claim 1 wherein said coupling means comprises an aluminum container.

3. The well logging system according to claim 1 wherein said coupling means comprises a copper container.

References Cited

UNITED STATES PATENTS

| | | | |
|---|---|---|---|
| 3,013,186 | 12/1961 | Jones | 165—135 X |
| 3,038,074 | 6/1962 | Scherbatskoy | 250—71.5 X |
| 3,105,148 | 9/1963 | Monaghan et al. | 250—71.5 |
| 3,174,301 | 3/1965 | Thornton et al. | 62—291 |
| 3,215,194 | 11/1965 | Sununu et al | 165—80 |
| 3,258,593 | 6/1966 | Reed et al. | 250—71.5 |
| 3,265,893 | 8/1966 | Rabson et al. | 250—71.5 |

MEYER PERLIN, Primary Examiner.

ROBERT A. O'LEARY, Examiner.

A. W. DAVIS, JR., Assistant Examiner.